United States Patent
Clark et al.

(10) Patent No.: US 10,013,404 B2
(45) Date of Patent: Jul. 3, 2018

(54) TARGETED STORY SUMMARIZATION USING NATURAL LANGUAGE PROCESSING

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 14/957,655

(22) Filed: Dec. 3, 2015

(65) Prior Publication Data

US 2017/0161242 A1    Jun. 8, 2017

(51) Int. Cl.
*G06F 17/22*   (2006.01)
*G06F 17/27*   (2006.01)

(52) U.S. Cl.
CPC ...... *G06F 17/2264* (2013.01); *G06F 17/2705* (2013.01); *G06F 17/2785* (2013.01)

(58) Field of Classification Search
CPC .................................................. G06F 17/2785
See application file for complete search history.

(56) References Cited

U.S. PATENT DOCUMENTS

| | | | | |
|---|---|---|---|---|
| 5,721,939 A * | 2/1998 | Kaplan | ................ | G06F 17/277 704/1 |
| 6,289,304 B1 * | 9/2001 | Grefenstette | ..... | G06F 17/30719 704/9 |
| 7,092,871 B2 * | 8/2006 | Pentheroudakis | .. | G06F 17/2725 704/9 |
| 7,117,206 B1 | 10/2006 | Bharat et al. | | |
| 7,587,309 B1 * | 9/2009 | Rohrs | ............... | G06F 17/30719 704/10 |
| 7,752,204 B2 * | 7/2010 | Kao | .................. | G06F 17/30719 707/736 |
| 8,145,677 B2 | 3/2012 | Al-Shameri | | |
| 8,380,492 B2 | 2/2013 | Xu et al. | | |
| 8,407,253 B2 | 3/2013 | Ryu et al. | | |

(Continued)

OTHER PUBLICATIONS

Ciampaglia et al., "Computational fact checking from knowledge networks," arXiv:1501.03471v1, Jan. 14, 2015, 20 pages.

(Continued)

*Primary Examiner* — Forrest F Tzeng
(74) *Attorney, Agent, or Firm* — Robert J. Shatto (57) ABSTRACT

A computer system may receive a textual work. The computer system may generate a knowledge graph based on the textual work. The knowledge graph may include nodes representing concepts and edges between the nodes that represent links between the concepts. The computer system may then generate a concept path for a target concept. The computer system may then identify a related background narrative block that contains a related non-target concept. The background narrative block may be a narrative block that is not in the concept path for the target concept. The computer system may then summarize the related background narrative block and output the summary to an output device coupled with the computer system.

19 Claims, 6 Drawing Sheets

(56) References Cited

U.S. PATENT DOCUMENTS

| | | |
|---|---|---|
| 8,990,234 B1 | 3/2015 | Myslinski |
| 9,015,037 B2 | 4/2015 | Myslinski |
| 9,679,558 B2 | 6/2017 | Akbacak et al. |
| 2006/0106847 A1 | 5/2006 | Eckhardt, III et al. |
| 2007/0130257 A1* | 6/2007 | Bedi ............... G06Q 10/107 709/204 |
| 2009/0012842 A1 | 1/2009 | Srinivasan et al. |
| 2009/0094231 A1* | 4/2009 | Marvit ............ G06F 17/30616 |
| 2010/0262576 A1* | 10/2010 | Stockwell ......... G06F 17/2785 706/55 |
| 2011/0137919 A1 | 6/2011 | Ryu et al. |
| 2011/0302168 A1* | 12/2011 | Aggarwal ......... G06F 17/30619 707/739 |
| 2012/0056901 A1* | 3/2012 | Sankarasubramaniam ............... G06F 3/005 345/660 |
| 2012/0102405 A1 | 4/2012 | Zuckerman et al. |
| 2014/0169767 A1 | 6/2014 | Goldberg |
| 2014/0172427 A1* | 6/2014 | Liu ..................... H04L 51/32 704/239 |
| 2014/0195897 A1* | 7/2014 | Balinsky ........... G06F 17/30719 715/254 |
| 2014/0280614 A1 | 9/2014 | Alakuijala et al. |
| 2014/0282586 A1 | 9/2014 | Shear et al. |
| 2016/0292248 A1 | 10/2016 | Garcia |
| 2017/0161311 A1 | 6/2017 | Clark et al. |
| 2017/0161398 A1 | 6/2017 | Clark et al. |
| 2017/0213130 A1* | 7/2017 | Khatri ............... G06F 17/30719 |

OTHER PUBLICATIONS

Anyanwu et al., "SPARQ2L: Towards Support for Subgraph Extraction Queries in RDF Databases," Proceedings of the 16th International Conference on World Wide Web, pp. 797-806, May 8-12, 2007, Banff, Alberta, Canada ACM 978-1-59593-654-7/07/0005.

Cedeno et al., "R2DF Framework for Ranked Path Queries over Weighted RDF Graphs," Proceedings of the International Conference on Web Intelligence, Mining and Semantics, Article No. 40, 12 pages, May 25-27, 2011, Sogndal, Norway, Copyright 2011 ACM DOI: 10.1145/1988688.1988736.

Kasneci et al., "NAGA: Searching and Ranking Knowledge," IEEE 24th International Conference on Data Engineering, Apr. 7-12, 2008, pp. 953-962, Cancun, © 2008 IEEE DOI: 10.1109/ICDE.2008.4497504.

Seijo, G., "Rhizomes for the Understanding of the Production of Social Sciences," Organization Management Journal, 17 pages.

Clark et al., "Using Knowledge Graphs to Identify Potential Inconsistencies in Works of Authorship," U.S. Appl. No. 14/957,646, filed Dec. 3, 2015.

Clark et al., "Structuring Narrative Blocks in a Logical Sequence," U.S. Appl. No. 14/957,647, filed Dec. 3, 2015.

List of IBM Patents or Patent Applications Treated as Related, Dated Dec. 2, 2015, 2 pages.

* cited by examiner

TARGETED STORY SUMMARIZATION USING NATURAL LANGUAGE PROCESSING

BACKGROUND

The present disclosure relates generally to the field of natural language processing, and more particularly to summarizing background information in a work of authorship.

It is common in literature to have a narrative universe of characters and events that appear in a book or movie, or across several different books or movies. When reading material in the narrative universe, a reader could skip portions of the narrative to strike his own path through the story. For example, a reader could read several books in a series of books and skip some books to avoid aspects of the narrative that he has less interest in, or simply to shorten the amount of reading that needs to be done.

SUMMARY

Embodiments of the present invention disclose a method, computer program product, and system for summarizing background information in a work of authorship. A computer system that includes a processor and a memory that stores one or more natural language processing modules may receive a textual work. The computer system may then generate a knowledge graph based on the textual work. The knowledge graph may include nodes representing concepts and edges between the nodes that represent links between the concepts. The computer system may then generate a concept path for a target concept. The concept path may include a plurality of narrative blocks ordered to a corresponding narrative progression of the target concept through the textual work. The computer system may then identify a related background narrative block that contains a related non-target concept. The background narrative block may be a narrative block that is not in the concept path for the target concept. The computer may then summarize the related background narrative block and output the summary to an output device coupled with the computer system.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of natural language processing, and in particular to providing a user with a summary of related background information in a work of authorship. While the present disclosure is not necessarily limited to such applications, various aspects of the disclosure may be appreciated through a discussion of various examples using this context.

A user may wish to follow a single concept (e.g., a character, place) throughout a single work of authorship (e.g., a book) or across a series of works. As used herein, a work of authorship (also referred to as a "work") includes products of creative or factual expression, such as books, songs, and/or videos. The user may wish to skip sections of the work (e.g., chapters in a book) that do not involve the target concept. In some situations, skipping sections of the work may not be ideal because a section that does not contain the target concept may nevertheless include information that informs the user as to why the target concept's story progresses in the way it does. For example, the target concept may be a first character. The first character may be married to a second character. If the second character appears in a chapter of a book, the events of that chapter may shape the second character's actions in a way that affects the first character, even if the first character wasn't in the chapter. While embodiments of the present disclosure may relate to any kind of work of authorship (e.g., movies, songs, books), aspects of the disclosure are discussed as they relate to the summarization of sections of textual works (e.g., books).

In some embodiments of the present disclosure, a computer system may generate and provide to a reader following a target concept a summarization of related background information. As used herein, background information is any information relating to concepts other than the target concept. Related background information includes information that is needed to understand the target concept's story, while unrelated background information includes information that can safely be skipped by a reader following a target concept. For example, related background information may include information pertaining to a non-target concept that is related to the target concept. The non-target concept may be considered related to the target concept if, e.g., the computer system determines, using a knowledge graph, that the non-target concept has a relatedness score above a threshold. The use of a relatedness score to determine whether background information is related is discussed more thoroughly in reference to FIG. 6.

In some embodiments, the computer system may ingest a book using natural language processing techniques to generate a knowledge graph for the book. The book may also be broken up into a plurality of narrative blocks (e.g., paragraphs, chapters, sections). The computer system may generate a concept path for a target concept that indicates the concept's narrative progression through the narrative blocks.

Based on the concept path for the target concept, the computer system may identify narrative blocks that must be read (i.e., narrative blocks that include the target concept), referred to herein as concept narrative blocks, and background narrative blocks (i.e., narrative blocks that do not include the target concept). The computer system may then break the background narrative blocks into at least two groups: unrelated background narrative blocks and related background narrative blocks. The unrelated background narrative blocks may include narrative blocks that a reader can skip, and the related background narrative blocks may include narrative blocks that a reader must understand in order to follow the target concept. The computer system may generate a summary of the related background narrative blocks and provide the summary to the reader.

In some embodiments, the knowledge graph may include a plurality of nodes and edges. The nodes may relate to concepts found in the book, such as actors, characters, themes, and/or actions. The nodes may be linked together with edges to represent a connection between the nodes. For example, two concepts relating to persons may be linked together with an edge that represent that the persons are married. In some embodiments, actions may also be represented by edges (e.g., an edge between two concepts may indicate that a first character ran after second character).

In some embodiments, the concept path may indicate which narrative blocks a concept appears in. The concept path may be used to determine which narrative blocks only contain background information (whether related or unrelated). The concept path may also indicate the order in which the narrative blocks should (or can) be read. For example, a series of books may be published out of order; a second book in the series may take place earlier in the series' timeline than a first book in the series. Accordingly, the concept path for a character that appears in both books may indicate that a reader should (or can) read the second book before reading the first book. In some embodiments, a concept path may be generated for a target concept in response to a reader selecting the target concept.

In some embodiments, the computer system may use the knowledge graph to determine which background narrative blocks must be summarized and which may be skipped (i.e., which are related background narrative blocks and which are not). For example, the computer system may identify which concepts in the knowledge graph are intricately related to the target concept. The computer system may determine that background narrative blocks that include one of the intricately related concepts are related background narrative blocks and must be summarized. The computer system may also determine that narrative blocks containing background information that do not include an intricately related concept can be skipped.

Figure 1:
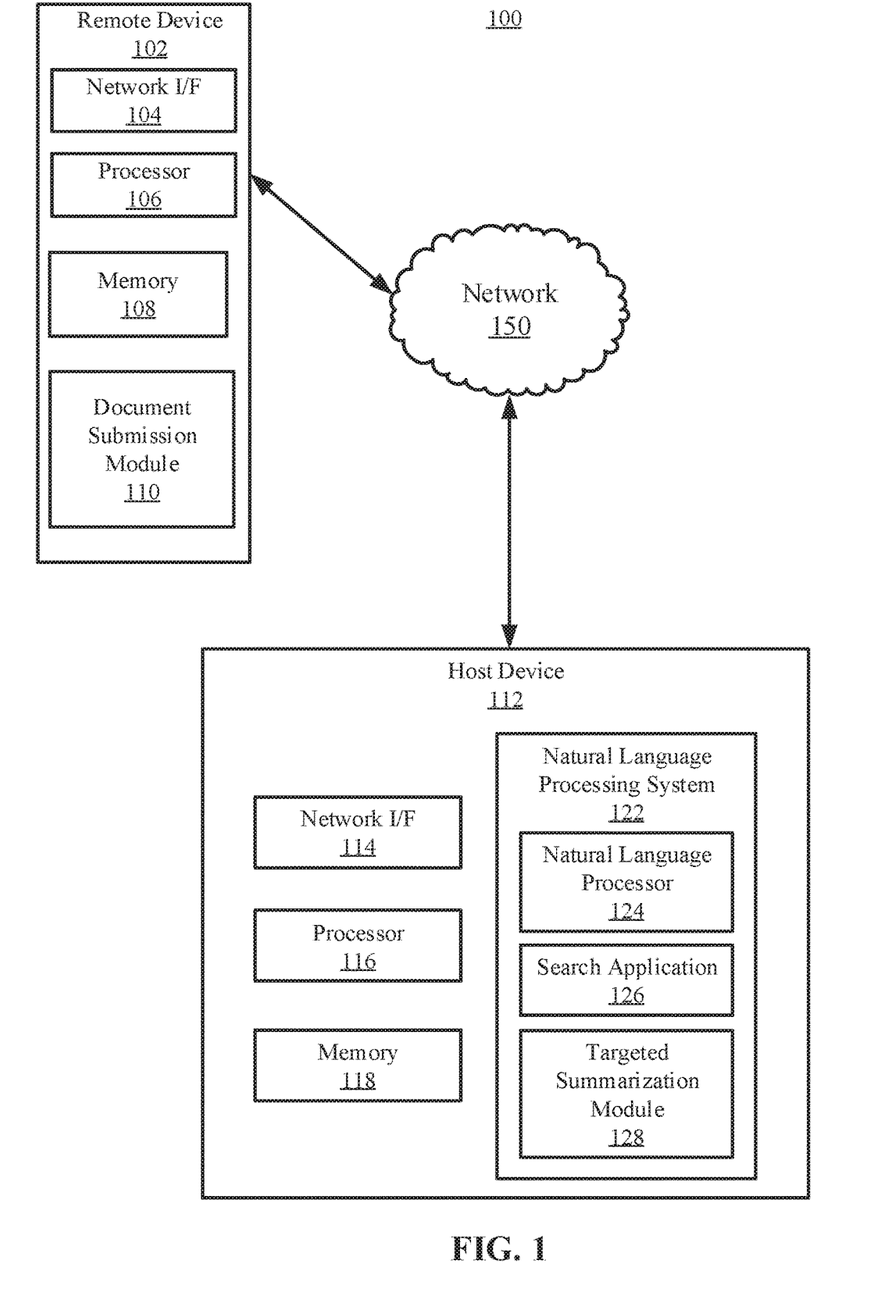
FIG. 1 illustrates a block diagram of an example computing environment in which illustrative embodiments of the present disclosure may be implemented.

As discussed above, aspects of the disclosure may relate to natural language processing. Accordingly, an understanding of the embodiments of the present disclosure may be aided by describing embodiments of natural language processing systems and the environments in which these systems may operate. Turning now to the figures, FIG. 1 illustrates a block diagram of an example computing environment 100 in which illustrative embodiments of the present disclosure may be implemented. In some embodiments, the computing environment 100 may include a remote device 102 and a host device 112.

Consistent with various embodiments, the remote device 102 and the host device 112 may be computer systems. The remote device 102 and the host device 112 may include one or more processors 106 and 116 and one or more memories 108 and 118, respectively. The remote device 102 and the host device 112 may be configured to communicate with each other through an internal or external network interface 104 and 114. The network interfaces 104 and 114 may be, e.g., modems or network interface cards. The remote device 102 and/or the host device 112 may be equipped with a display or monitor. Additionally, the remote device 102 and/or the host device 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). The host device 112 may, in various embodiments, be connected to an output device. The output device includes any device that may be used to read, listen to, print out, or watch the work. For example, the output device may be a tablet, an e-reader, or a printer. In some embodiments, the remote device 102 and/or the host device 112 may be servers, desktops, laptops, or hand-held devices.

The remote device 102 and the host device 112 may be distant from each other and communicate over a network 150. In some embodiments, the host device 112 may be a central hub from which remote device 102 can establish a communication connection, such as in a client-server networking model. Alternatively, the host device 112 and remote device 102 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote device 102 and the host device 112 may be local to each other, and communicate via any appropriate local communication medium. For example, the remote device 102 and the host device 112 may communicate using a local area network (LAN), one or more hardwire connections, a wireless link or router, or an intranet. In some embodiments, the remote device 102 and the host device 112 may be communicatively coupled using a combination of one or more networks and/or one or more local connections. For example, the first remote device 102 may be hardwired to the host device 112 (e.g., connected with an Ethernet cable) while a second remote device (not shown) may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote device 102 may enable users to submit (or may submit automatically with or without user input) electronic documents (e.g., works of authorship such as books) to the host devices 112 in order to summarize related background information regarding a target concept. For example, the remote device 102 may include electronic document submission module 110 and a user interface (UI). The electronic document submission module 110 may be in the form of a web browser or any other suitable software module, and the UI may be any type of interface (e.g., command line prompts, menu screens, graphical user interfaces). The UI may allow a user to interact with the remote device 102 to submit, using the document submission module 110, one or more books or other works of authorship to the host device 112.

In some embodiments, a user may scan physical documents into the remote device (or the host device). The remote device (or host device) may then perform optical character recognition on the scanned documents to convert the document to machine-encoded text. The machine-encoded text may, if necessary, be transmitted to the host device using the document submission module 110 and the user interface.

In some embodiments, the host device 112 may include a natural language processing system 122. The natural language processing system 122 may include a natural language processor 124, a search application 126, and a targeted summarization module 128. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 2.

The search application 126 may be implemented using a conventional or other search engine, and may be distributed across multiple computer systems. The search application 126 may be configured to search one or more databases or other computer systems for content that is related to an electronic document (such as a book) submitted by a remote device 102. For example, the search application 126 may be configured to search a corpus (or universe) of books related to the submitted book to identify relationships between the target concept and other concepts to generate a knowledge graph. The targeted summarization module 128 may be configured to analyze a book to determine which narrative blocks contain background information relating to the target concept, and to analyze those narrative blocks to determine which must be summarized and which can be skipped. The targeted summarization module 128 may include one or more modules or units, and may utilize the search application 126, to perform its functions (e.g., to determine which narrative blocks can be skipped and which must be summarized), as discussed in more detail in reference to FIG. 2.

While FIG. 1 illustrates a computing environment 100 with a single host device 112 and a single remote device 102, suitable computing environments for implementing embodiments of this disclosure may include any number of remote devices and host devices. The various modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to generate a knowledge graph for a submitted book, and the second host device may include a software module configured to generate a concept path for a target concept and to determine which narrative blocks must be summarized.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
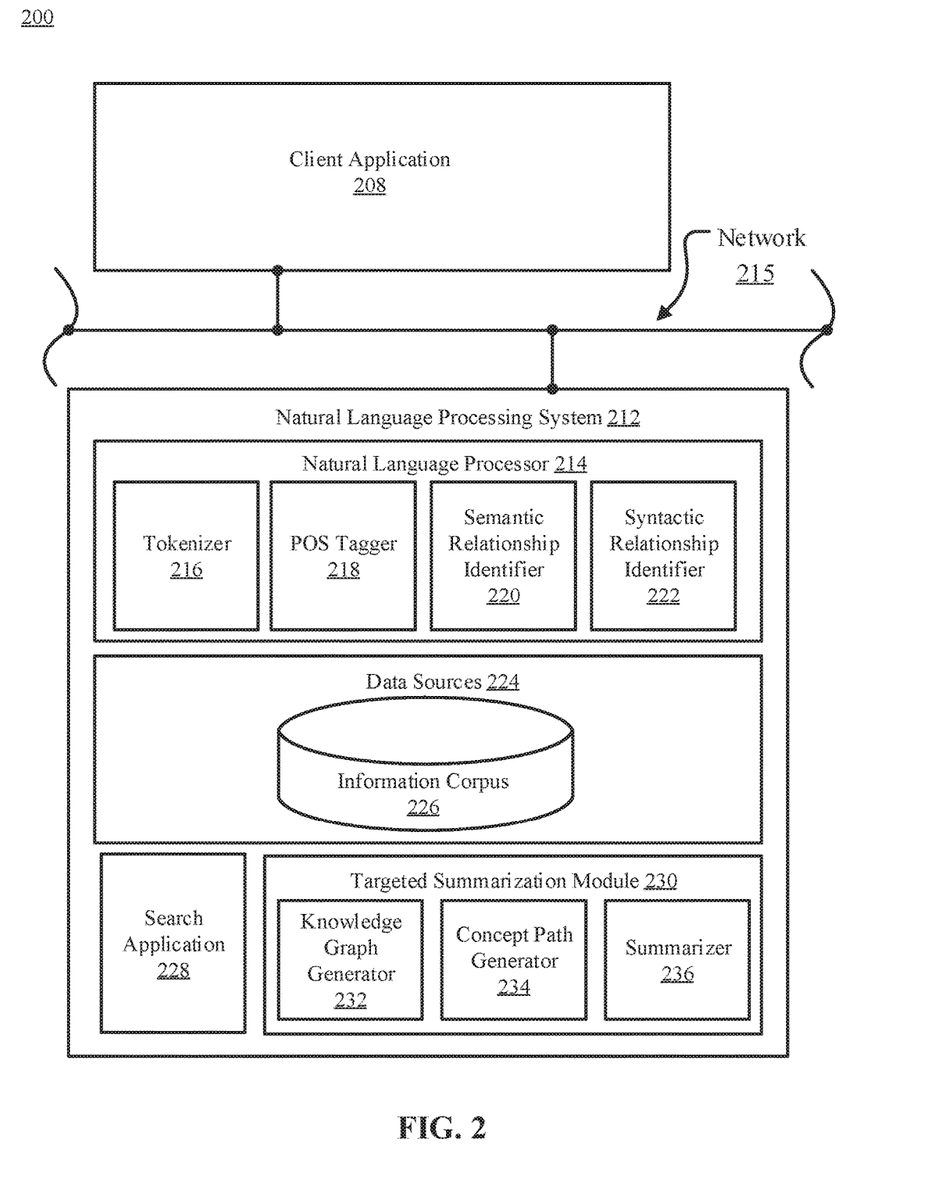
FIG. 2 illustrates a block diagram of an example natural language processing system configured to ingest a work of authorship and summarize background information, in accordance with embodiments of the present disclosure.

Referring now to FIG. 2, shown is a block diagram of an exemplary system architecture 200, including a natural language processing system 212, configured to summarize background information for a target concept, in accordance with embodiments of the present disclosure. In some embodiments, a remote device (such as remote device 102 of FIG. 1) may submit electronic documents (such as a book) to be analyzed to the natural language processing system 212 which may be housed on a host device (such as host device 112 of FIG. 1). Such a remote device may include a client application 208, which may itself involve one or more entities operable to generate or modify information in the book that is then dispatched to a natural language processing system 212 via a network 215.

Consistent with various embodiments, the natural language processing system 212 may respond to electronic document submissions sent by the client application 208. Specifically, the natural language processing system 212 may analyze a received book to identify and summarize related background information for a target concept. In some embodiments, the natural language processing system 212 may include a natural language processor 214, data sources 224, a search application 228, and a targeted summarization module 230. The natural language processor 214 may be a computer module that analyzes the received books and other electronic documents. The natural language processor 214 may perform various methods and techniques for analyzing electronic documents (e.g., syntactic analysis, semantic analysis, etc.). The natural language processor 214 may be configured to recognize and analyze any number of natural languages. In some embodiments, the natural language processor 214 may parse passages of the documents. Further, the natural language processor 214 may include various modules to perform analyses of electronic documents. These modules may include, but are not limited to, a tokenizer 216, a part-of-speech (POS) tagger 218, a semantic relationship identifier 220, and a syntactic relationship identifier 222.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one book may shed light on the meaning of text elements in another book, particularly if they are part of the same corpus or universe). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by the natural language processing system 212.

In some embodiments, the semantic relationship identifier 220 may be a computer module that may be configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that may be configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that may parse a document and generate corresponding data structures for one or more portions of the document. For example, in response to receiving a book at the natural language processing system 212, the natural language processor 214 may output parsed text elements from the book as data structures. In some embodiments, a parsed text element may be represented in the form of a parse tree or other graph structure. To generate the parsed text element, the natural language processor 214 may trigger computer modules 216-222.

In some embodiments, the output of the natural language processor 214 may be stored as an information corpus 226 in one or more data sources 224. In some embodiments, data sources 224 may include data warehouses, information corpora, data models, and document repositories. The information corpus 226 may enable data storage and retrieval. In some embodiments, the information corpus 226 may be a storage mechanism that houses a standardized, consistent, clean, and integrated copy of the ingested and parsed book(s). The information corpus 226 may also include a list of concepts found in the ingested book(s). The data may be sourced from various operational systems. Data stored in the information corpus 226 may be structured in a way to specifically address analytic requirements. For example, the information corpus 226 may store the ingested book(s) as a plurality of narrative blocks to make concept path generation easier. In some embodiments, the information corpus 226 may be a relational database.

In some embodiments, the natural language processing system 212 may include a targeted summarization module 230. The targeted summarization module 230 may be a computer module that is configured to generate a knowledge graph and a concept path for a target concept, determine which narrative blocks to summarize, and provide to a reader a summary of those narrative blocks. In some embodiments, the targeted summarization module 230 may contain submodules. For example, the targeted summarization module 230 may contain a knowledge graph generator 232, a concept path generator 234, and a summarizer 236. The knowledge graph generator 232 may be configured to parse a received book using the natural language processor 214 and related subcomponents 216-222. The knowledge graph generator 232 may then generate, from the parsed book, a knowledge graph consisting of a plurality of nodes (each relating to a different concept) and edges. In some embodiments, the knowledge graph generator 232 may use a search application 228 to search a set of (i.e., one or more) corpora (e.g., data sources 224) to identify the concepts and relationships between the concepts to generate a knowledge graph.

The concept path generator 234 may be configured to identify a target concept and generate a concept path for the target concept. In some embodiments, the concept path generator 234 may prompt a user (such as a reader) to select the target concept from, e.g., a list of concepts that appear in the book. The concept path generator 234 may break the ingested book into narrative blocks using the natural language processor 214 and related subcomponents 216-222. The concept path generator 234 may then search the narrative blocks using, e.g., a search application 228 to identify which narrative blocks contain the target concept and which narrative blocks do not in order to generate the concept path.

The summarizer 236 may be a computer module that is configured to generate a summarization of the narrative blocks that contain related background information. The summarizer 236 may receive, from the concept path generator 234, a list of narrative blocks that do not include the target concept (i.e., are background narrative blocks). The summarizer may also determine, using the knowledge graph, which concepts are intricately related to the target concept. The summarizer 236 may then search the background narrative blocks using, e.g., the search application 228, to determine whether they include related concepts. If a related concept is not present in a background narrative block, the summarizer 236 may determine that the reader can skip that narrative block. For each background narrative block that does contain one or more intricately related concepts, the summarizer 236 may generate a summary of the narrative block. The summaries may be then presented to a reader as discussed in reference to FIG. 5.

Figure 3:
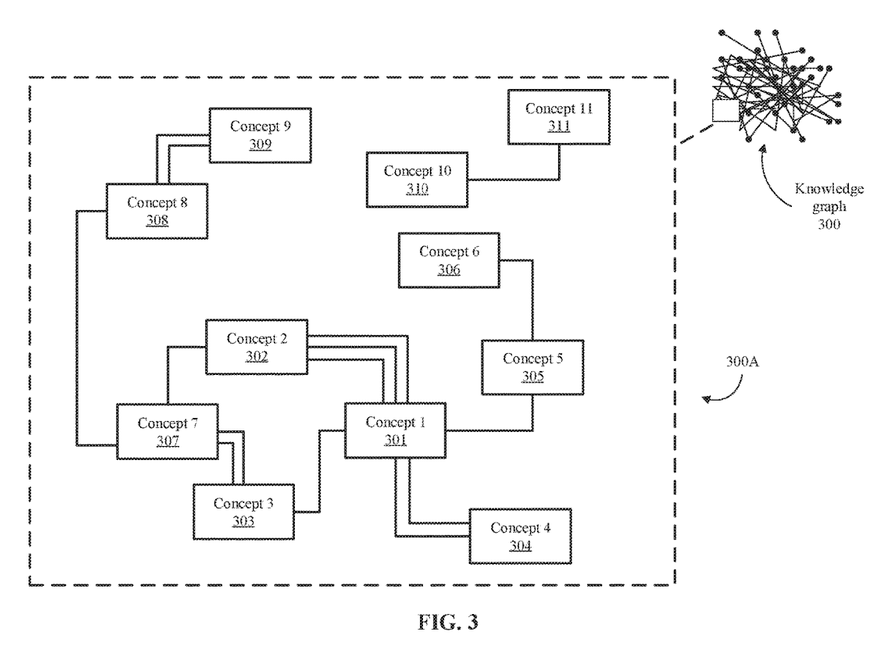
FIG. 3 illustrates an exemplary knowledge graph for a work of authorship, in accordance with embodiments of the present disclosure.

FIG. 3 illustrates a close-up view of a portion 300A of an exemplary knowledge graph 300 for a book, in accordance with embodiments of the present disclosure. The close-up view of the portion 300A includes eleven nodes 301-311, with each node relating to a different concept. The nodes 301-311 are connected by edges that represent connections between the concepts. For example, if two connected concepts correspond to characters in a book, an edge connecting them may represent that the characters are married. A computer system may generate the knowledge graph 300 using natural language processing techniques.

In some embodiments, the number of edges connecting two concepts may correspond to a level of relatedness between the concepts. For example, concept 1 301 and concept 2 302 are connected with three edges, whereas concept 1 301 is connected to concept 5 305 by a single edge. This may indicate that concept 1 301 and concept 2 302 are more closely related than concept 1 and concept 5 305. The computer system may generate a relatedness score for two concepts using the number of edges connecting the two concepts together.

In some embodiments, the relatedness score may also consider the relatedness of concepts that, while not directly connected to each other in the knowledge graph 300, are each connected to the same concept. The computer system may look at whether a path can be taken through other concepts to connect the two concepts. For example, a path can be drawn to connect concept 1 301 and concept 6 306 by going through concept 5 305. The length of the path may be considered when determining a relatedness score between two concepts.

The computer system may also consider the number of other concepts that the two concepts are connected to in determining a relatedness score. For example, concept 7 307 is not connected by an edge to concept 1 301. However, concept 7 307 and concept 1 301 are both connected to concepts 3 303 and 2 302. The computer system may determine that, despite not being directly connected, concepts 7 307 and 1 301 are somewhat related. Accordingly, the relatedness score between them may be higher than, e.g., the relatedness score between concept 1 301 and concept 9 309, which are distantly connected to each other, or than concept 1 301 and concept 11 311, which cannot be connected.

In some embodiments, the nodes 301-311 may be generated using "fuzzy logic" and/or concept matching. This may be done to ensure that different words or phrases relating to the same concept are included in a single node. For example, a book may refer to a character's "pet," "dog," and "german shepherd" at different points. A computer system using natural language processing techniques and fuzzy logic may determine that all three words refer to the same concept. Accordingly, all three terms may be represented in the knowledge graph using a single node, and any edges between any of the three terms and other concepts may connect to that node.

In some embodiments, the nodes 301-311 can be weighted according to their importance. This may be represented in the knowledge graph 300 by, e.g., making the nodes 301-311 larger or smaller. The nodes 301-311 may be weighted according to the number of edges that connect to the nodes. In various embodiments, the nodes 301-311 may be weighted according to the importance of the associated concept. For example, concepts relating to natural elements (e.g., time of day) may be weighted less than concepts relating to actors (e.g., characters) and events (e.g., a wedding or battle).

Figure 4:
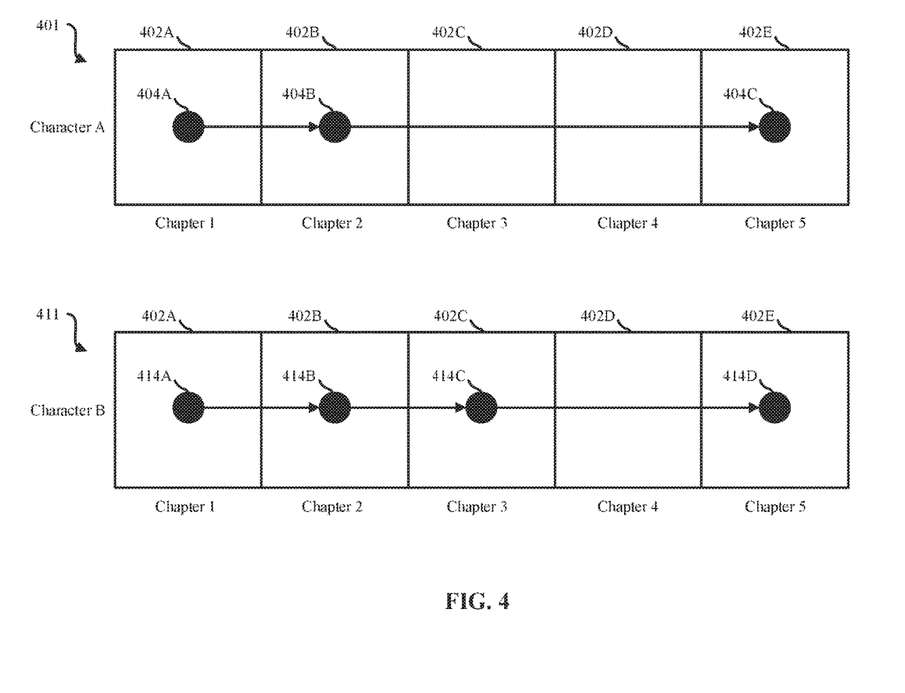
FIG. 4 illustrates concept paths for two characters in a book, in accordance with embodiments of the present disclosure.

FIG. 4 illustrates concept paths 401 and 411 for two concepts, in accordance with embodiments of the present disclosure. The first concept path 401 is a concept path for a first character in a book (Character A) and the second concept path 411 is a concept path for a second character in the book (Character B). The concept paths 401 and 411 illustrate the narrative progression through a book for Character A and Character B, respectively. Both concept paths 401 and 411 include five narrative blocks 402A-402E. The narrative blocks correspond to chapters in the book. For example, the first narrative block 402A corresponds to the first chapter in the book, the second narrative block 402B corresponds to the second chapter in the book, and so on. The points 404A-C and 414A-D in the concept paths 401 and 411 indicate which chapters Character A and Character B appear in, respectively.

For example, the first concept path 401 indicates that Character A appears in the first chapter 402A, the second chapter 402B, and the fifth chapter 402E of the book. The second concept path 411 indicates that Character B appears in the first chapter 402A, the second chapter 402B, the third chapter 402C, and the fifth chapter 402E of the book. Neither character appears in the fourth chapter 402D of the book.

In some embodiments, the concept paths 401 and 411 may be used to determine which narrative blocks contain background information for the concepts and which narrative blocks must be read to follow the concepts. For example, because the first narrative path 401 for Character A indicates that Character A does not appear in the third 402C and fourth 402D chapters, a computer system may determine that the third and fourth chapters contain only background information for Character A. Likewise, the computer system may determine that the fourth chapter 402D contains background information for Character B.

In some embodiments, the computer system may use the concept paths 401 and 411 to determine which narrative blocks are related background narrative blocks and must be summarized. For example, based on a knowledge graph, the computer system may determine that Character A and Character B are very closely related. Therefore, a reader that is only concerned with reading about Character A will nevertheless need to understand what is going on with Character B to understand Character A's story. The computer system may then determine which, if any, of the background narrative blocks (402C and 402D) contain related background information (i.e., are related background narrative blocks) for Character A. Even though Character A does not appear in the third chapter 402C, the computer system may determine that the third chapter is a related background narrative block because Character B appears in it. Accordingly, the computer system may provide a summary of the third chapter 402C to the reader before proceeding from the second chapter 402B to the fifth chapter 402E so that the reader can understand the fifth chapter. The level of summarization may, in some embodiments, be based on how closely related Character A and Character B are.

The concept paths 401 and 411 are shown for illustrative purposes only. Many other ways of representing the information (e.g., using lists, tables, etc.) will be readily apparent to a person of ordinary skill in the art. The disclosure should not be limited to any particular way of representing concept paths.

Figure 5:
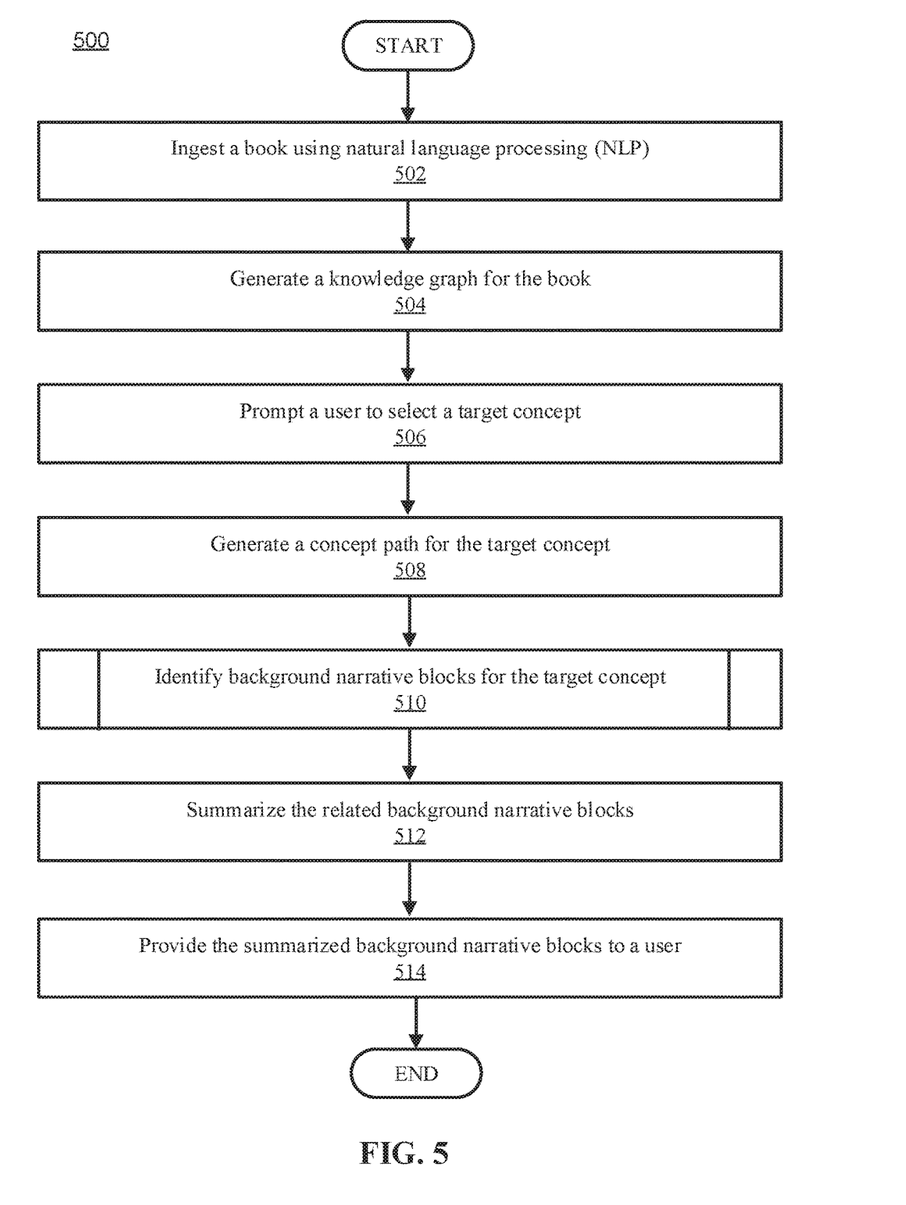
FIG. 5 illustrates a method for providing targeted summarization of related background information to a reader, in accordance with embodiments of the present disclosure.

FIG. 5 illustrates a method 500 for providing targeted summarization of background information to a reader, in accordance with embodiments of the present disclosure. The method 500 may be performed by a computer system, such as the host device 112 (shown in FIG. 1). The method 500 may begin at operation 502, where the computer system may ingest a book using natural language processing.

Natural language processing, as discussed herein, may incorporate any relevant natural processing techniques including, without limitation, those techniques discussed in reference to modules 216-222 in FIG. 2. For example, in embodiments, the natural language processing technique may include analyzing syntactic and semantic content in the book. The natural language processing technique may be configured to parse structured data (e.g., tables, graphs) and unstructured data (e.g., textual content containing words, numbers). In certain embodiments, the natural language processing technique may be embodied in a software tool or other program configured to analyze and identify the semantic and syntactic elements and relationships present in the book. More particularly, the natural language processing technique can include parsing the grammatical constituents, parts of speech, context, and other relationships (e.g., modifiers) of the book. The natural language processing technique can be configured to recognize keywords, contextual information, and metadata tags associated with words, phrases, or sentences related to concepts (e.g., actors, characters, etc.). The syntactic and semantic elements can include information such as word frequency, word meanings, text font, italics, hyperlinks, proper names, noun phrases, parts-of-speech, or the context of surrounding words. Other syntactic and semantic elements are also possible.

After ingesting the book at operation 502, the computer system may generate a knowledge graph for the book at operation 504. The knowledge graph may have the same or similar characteristics and/or appearance as the knowledge graph 300 discussed in reference to FIG. 3. In some embodiments, for example, the knowledge graph may include a plurality of nodes and edges. The nodes may relate to concepts found in the book, such as actors, characters, themes, and/or actions. The nodes may be linked together with edges to represent a connection between the nodes. For example, two concepts relating to persons may be linked together with an edge that represent that the persons are married. In some embodiments, actions may also be represented by edges (e.g., an edge between two concepts may indicate that a first character chased a second character).

In some embodiments, the knowledge graph may be generated by parsing the book to identify subject-predicate-object triplets. In some embodiments, this may involve analyzing parse trees generated by a natural language processor, such as the natural language processor 214 (shown in FIG. 2). The subject and objects in the sentence may be represented by nodes in a knowledge graph, whereas the predicate may be represented by an edge. For example, a sentence in a book might read "George II is the King of England." A natural language processing system may parse this sentence to identify a subject ("George II"), a predicate ("is the"), and an object ("King of England"). Based on the parsing, the natural language processing system may generate nodes for "George II" and "King of England." The nodes may be connected by an edge denoting a relationship between the nodes (i.e., indicating that George II is the King of England).

After generating a knowledge graph at operation 504, the computer system may prompt a user (e.g., a reader) to select a target concept that he wishes to read about at operation 506. In some embodiments, the computer system may provide a list of concepts to the reader. The computer system may include any suitable user interface (UI) for allowing a reader to select a target concept. For example, the UI may be a graphical user interface (GUI) or a command prompt.

In some embodiments, the reader may select more than one target concept that he wishes to read about. For example, a reader may select two different characters in the book that he wishes to read about. As another example, the reader may select a character that he is interested in reading about and a different concept, such as a battle or a specific location in the book (e.g., everything that happens in a specific city).

In various embodiments, the user may indicate a level of interest in each of the target concepts that he selects. In some embodiments, the level of interest may be the same for each target concept. In other embodiments, each target concept may be assigned a separate level of interest. The level of interest may, in some embodiments, indicate whether the reader wants to read the entire narrative block or a summarization of the narrative block if the narrative block includes the target concept.

In some embodiments, the level of interest may dictate a different level of summarization that is provided to the reader. For example, a reader may select three target concepts. The reader may have a high level of interest in the first target concept, a medium level of interest in the second target concept, and a low level of interest in the third target concept. Narrative blocks that only contain related background information for any of the three target concepts may be heavily summarized (e.g., summarized such that the reader only reads what is absolutely necessary to understand the rest of the story). Narrative blocks containing the first target concept may be presented to the user as written (i.e., with no summarization). Narrative blocks containing the second target concept may be presented to the user with a low amount of summarization (i.e., mostly as written). Meanwhile, narrative blocks containing the third target concept may be presented to the user with a high level of summarization.

After prompting a user to select a target concept at operation 506, the computer system may generate a concept path for the target concept at operation 508. The concept path may indicate which narrative blocks include the target concept. In some embodiments, the concept path may also indicate the order in which the narrative blocks should be read. For example, if a series of books are published out of order (e.g., the story told in the third book takes place before the story told in the second book), the generated concept path may indicate that the reader should start with the third book and, after finishing it, should move on the second book. The concept path may be similar to the concept paths 401 and 411 discussed in reference to FIG. 4.

At operation 510, the computer system may identify which narrative blocks must be read and which narrative blocks contain only background information. The computer system may also determine which of the background information narrative blocks contain related background information that must be known by the reader to understand the target concept. In some embodiments, the computer system may first group the narrative blocks into two categories: concept narrative blocks (i.e., narrative blocks containing the target concept) and background narrative blocks (i.e., narrative blocks that do not contain the target concept). The computer system may group the blocks using the concept path.

After separating the background narrative blocks from the concept narrative blocks, the computer system may further divide the background narrative blocks into those that are related and those that are unrelated. The related background narrative blocks are those that must be read or summarized in order to understand the target concept. The background narrative blocks may be grouped according to, e.g., whether or not they contain a concept that is closely related to the target concept. A method for dividing the background narrative blocks is discussed more thoroughly in reference to FIG. 6.

In some embodiments, a user may elect to receive a summary of the unrelated background narrative blocks instead of skipping those sections. The user may choose a level of summarization for the unrelated background narrative blocks. The chosen level of summarization may be the same as the level of summarization chosen for related background narrative blocks. In various embodiments, the level of summarization for unrelated background narrative blocks may differ from the level of summarization for related background narrative blocks.

At operation 512, the computer system may summarize the related background narrative blocks. The computer system may use any known technique for computer-generated text summarization, also known as "automatic summarization." Automatic summarization is the process of reducing a text document with a computer program in order to create a summary that retains the most important points of the original document. Technologies that can make a coherent summary take into account variables such as length, writing style, and syntax.

Generally, there are two approaches to automatic summarization: extraction and abstraction. Extractive methods work by selecting a subset of existing words, phrases, or sentences in the original text to form the summary. In contrast, abstractive methods build an internal semantic representation and then use natural language generation techniques to create a summary that is closer to what a human might generate. Such a summary might contain words not explicitly present in the original. Many different automatic summarization methods are known and may be used consistent with this disclosure.

In some embodiments, the computer system may be configured to provide different levels of summarization. The different levels of summarization may employ the same summarization techniques, but to a different degree, or may use different summarization techniques altogether. For example, heavily summarized sections may rely on an extractive summarization method to extract and highlight key words or phrases, whereas less summarized section may be generated using an abstractive method that may provide better readability, but result in longer passages than the extractive method. In some embodiments, a user may select the level of summarization. The chosen level of summarization may, in embodiments, apply to all summarized narrative blocks. In some embodiments, each related concept may have its own level of summarization chosen by the reader. In some embodiments, the computer system may set the level of summarization. The level of summarization for a narrative block may be based on, e.g., the relatedness of the non-target concepts in the narrative block. Determining the relatedness of concepts is discussed more thoroughly in reference to FIG. 6.

In some embodiments, the computer system may automatically adjust the level of summarization. The automatic adjustments may be performed dynamically (i.e., while the reader is reading the book) or at discrete point (e.g., when the reader first loads the book, when the reader progresses to a new narrative block, etc.). The level of summarization may be based on, e.g., the reader's historical input. For example, if the reader consistently adjusts the level of summarization of narrative blocks containing a specific non-target concept, the computer system may adjust the level of summarization for those narrative blocks going forward.

In various embodiments, the computer system may also adjust the level of summarization for other non-target concepts with comparable relatedness scores. For example, if the reader consistently adjusts the level of summarization when reading narrative blocks containing a non-target concept with a certain relatedness score (e.g., a score of 60), the computer system may dynamically adjust its level of summarization for other narrative blocks with similar scoring non-target concepts (e.g., scores of 55-65).

In some embodiments, the computer system may tailor the summarization of the narrative block according to the reason for the summarization. For example, the computer system may summarize a particular narrative block because it contains a particular non-target concept, the particular non-target concept being related to the target concept. Accordingly, the particular narrative block may be summarized such that information relating to the particular non-target concept is found in the summary, while other information in the narrative block (such as information related to other concepts) is ignored (e.g., left out of the summary).

After summarizing the related background narrative blocks at operation 512, the computer system may provide the summarized narrative blocks to the user at operation 514. In some embodiments, the computer system may transmit the summarized narrative blocks to an output device, such as a tablet or an e-reader. In some embodiments, the computer system may replace summarized narrative blocks with their corresponding summaries and output a summarized version of the work (e.g., with summaries replacing the related background narrative blocks) to the user.

For example, a user may scan a textual work, such as a book. The computer system may use optical character recognition to convert the book to machine-encoded text. The computer system may then generate summaries for related background narrative blocks by, e.g., performing operations 502-512 of method 500. The computer system may then replace the related background narrative blocks with the generated summaries. The computer system may then transmit the summarized version of the work to the user by, e.g., sending it to an output device such as a tablet or e-reader. In some embodiments, the computer system may print the summarized version of the work. After providing the summarized narrative blocks to the user at operation 514, the method 500 may end.

Figure 6:
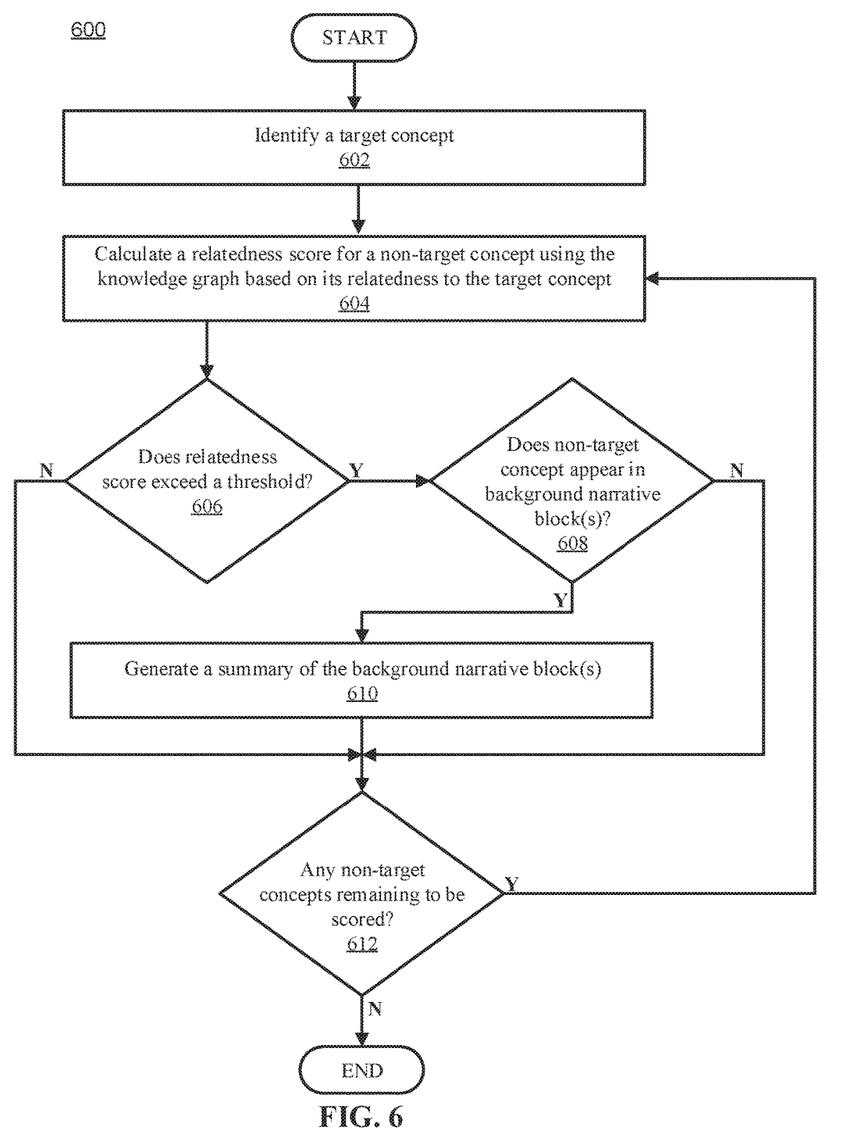
FIG. 6 illustrates a method for identifying and summarizing related background information, in accordance with embodiments of the present disclosure.

FIG. 6 illustrates a method 600 for identifying and summarizing background information, in accordance with embodiments of the present disclosure. The method 600 may be performed by a computer system, such as the host device 112 (shown in FIG. 1). The method 600 may begin at operation 602, where the computer system may identify a target concept. In some embodiments, the computer system may prompt a reader to select a target concept.

After identifying a target concept at operation 602, the computer system may calculate a relatedness score for a non-target concept using the knowledge graph at operation 604. The relatedness score may be based on the relatedness of the non-target concept to the target concept. The computer system may use a knowledge graph to determine the relatedness score. Various aspects of the relatedness score are discussed in more detail and with examples in reference to FIG. 3.

In some embodiments, the relatedness score may be based on the number of edges between the target concept and the non-target concept. The more edges that connect the concepts, the more closely related they may be, and the higher the non-target concept's relatedness score may be. The computer system may also consider the degrees of separation between concepts that are not connected when determining a relatedness score. The fewer degrees of separation between the target concept and the non-target concept, the more closely related they may be.

In some embodiments, the total number of edges that the non-target concept connects to may impact the relatedness score. For example, concepts that relate to generic entities, such as "United States" or "Male," may link to a large number of other concepts. Because such a generic concept may appear in every (or almost every) narrative block, the computer system may penalize the non-target concept when calculating the relatedness score. In some embodiments, the computer system may be configured to ignore concepts relating to generic entities and may not consider them when determining whether a narrative block must be read.

After calculating a relatedness score for a non-target concept at operation 604, the computer system may determine whether the relatedness score exceeds a threshold at decision block 606. The threshold may be the minimum relatedness score that a non-target concept must achieve in order for the computer system to determine that the non-target concept is closely (aka intricately) related to the target concepts. Non-target concepts with a lower score may not be important enough to the target concept to need summarization (i.e., they can be skipped). Non-target concepts with a score exceeding the threshold may be important to the target concept, and narrative blocks containing the non-target concept may need to be summarized. The threshold may be set by a user or system administrator. In some embodiments, the threshold may be set automatically by the computer system based on historical data and the reader's response. For example, if a reader consistently reads narrative blocks that the computer system has decided can be skipped (e.g., because he is confused about subsequent narrative blocks), the computer system may adjust the threshold so that fewer narrative blocks are skipped.

If the computer system determines that the relatedness score does not exceed a threshold, the computer system may determine whether there are any unscored non-target concepts at decision block 612. If no unscored non-target concepts remain, the method 600 may end. If non-target concepts still need to be scored, the method 600 may return to operation 604 and a relatedness score may be generated for the next non-target concept. If the computer system determines that the relatedness score for a non-target concept exceeds the threshold at decision block 606, the method 600 may progress to decision block 608, where the computer system may determine whether the non-target concept is found in any of the background narrative blocks. If the non-target concept is not found in a background narrative block, the method 600 may progress to decision block 612. If the non-target concept does appear in a background narrative block, the method 600 may proceed to operation 610.

At operation 610, the computer system may generate a summary of the background narrative block(s) containing the non-target concept. In some embodiments, the level of summarization may be based on the relatedness score. For example, the higher the relatedness score for the non-target concept, the less summarization the background narrative blocks may undergo. After generating a summary of the related background narrative blocks containing the non-target concept at operation 610, the computer system may determine whether there are any unscored non-target concepts at decision block 612. If no unscored non-target concepts remain, the method 600 may end. If non-target concepts still need to be scored, the method 600 may return to operation 604 and a relatedness score may be generated for the next non-target concept.

In some embodiments, the computer system may score all non-target concepts before summarizing any background narrative blocks. The computer system may then check each background narrative block to determine whether it contains a non-target concept that exceeded the threshold. All background narrative blocks that do not contain any non-target concepts that surpassed the threshold may be marked for the reader to skip. All other background narrative blocks may then be summarized. In some embodiments, the level of summarization for each of the related background narrative blocks will depend on the target concept contained in the narrative block with the highest relatedness score. For example, a narrative block may contain two non-target concepts that are related to the target concept (i.e., two non-target concepts that exceed the threshold). A first non-target concepts may be moderately related to the target concept (e.g., have a relatedness score of 60), while the second non-target concept may be strongly related to the target concept (e.g., have a relatedness score of 80). If the computer system is configured to adjust the level of summarization according to the relatedness score, the level of summarization for the related background narrative block may be based on the second non-target concept.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the foregoing detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the foregoing description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for providing summaries of non-target concepts in a work of authorship, the method comprising:
   receiving a textual work by a computer system, the computer system having a processor and a memory storing one or more natural language processing modules executable to generate a summary of a portion of text;
   dividing the textual work into a plurality of narrative blocks, each narrative block being a contiguous portion of text within the textual work, each narrative block being separated from other narrative blocks by linguistic delimiters;
   receiving a selection of a target concept;
   identifying a first set of narrative blocks and a second set of narrative blocks, the first set of narrative blocks including one or more narrative blocks of the plurality of narrative blocks that include the target concept, the second set of narrative blocks including one or more background narrative blocks, the one or more background narrative blocks being narrative blocks of the plurality of narrative blocks that do not include the target concept;
   generating a concept path for the target concept, wherein the concept path includes the first set of narrative blocks ordered in a sequence, the sequence corresponding to a narrative progression of the target concept through the textual work;
   generating, by a natural language processor, a knowledge graph based on the textual work, wherein the knowledge graph includes nodes that represent concepts and edges between nodes that represent links between concepts, wherein the natural language processor includes:
      a tokenizer that is configured to convert a sequence of characters into a sequence of tokens by identifying word boundaries within the textual work,
      a part-of-speech tagger configured to determine a part of speech for each token using natural language processing and mark each token with its part of speech,
      a semantic relationship identifier configured to identify semantic relationships of recognized text elements in the textual work, and
      a syntactic relationship identifier configured to identify syntactic relationships amongst tokens,
   wherein generating the knowledge graph comprises:
      identifying a plurality of concepts in the textual work;
      determining which concepts in the textual work correspond to the same object using fuzzy logic and concept matching;
      generating a single node for each group of concepts that correspond to the same object; and
      identifying edges between nodes by analyzing the textual work for subject-predicate-object triplets, wherein a node corresponding to a subject and a node corresponding to an object are linked by an edge corresponding to the predicate;
   determining, using the knowledge graph, which non-target concepts are related to the target concept;
   identifying a related background narrative block, the related background narrative block containing a particular non-target concept, the particular non-target concept being related to the target concept, wherein the related background narrative block is not in the concept path for the target concept;
   generating, automatically by the computer system, a summary of the related background narrative block; and
   outputting the summary of the related background narrative block to an output device coupled with the computer system.

2. The method of claim 1, the method further comprising prompting a reader to select the target concept.

3. The method of claim 1, wherein the identifying the related background narrative block further comprises:
   identifying, using the concept path for the target concept, a particular background narrative block in the second set of narrative blocks;
   identifying the particular non-target concept;
   determining that the particular non-target concept is related to the target concept using the knowledge graph; and
   determining that the particular background narrative block includes the particular non-target concept.

4. The method of claim 3, wherein the determining that the particular non-target concept is related to the target concept comprises:
   determining a relatedness score for the particular non-target concept using the knowledge graph, the relatedness score being based on a relatedness of the particular non-target concept to the target concept; and
   determining that the particular non-target concept is related to the target concept by determining that the relatedness score for the particular non-target concept exceeds a threshold, the threshold being automatically set by the computer system based on historical data.

5. The method of claim 4, wherein the determining the relatedness score for the particular non-target concept includes determining, from the knowledge graph, a number of edges that connect the particular non-target concept to the target concept.

6. The method of claim 1, the method further comprising:
   receiving a selection of a level of summarization from a user, wherein the level of summarization determines an amount of information provided in the summary, wherein a high level of summarization results in the summary including less information than a low level of summarization, and
   wherein the summary is generated according to the level of summarization.

7. The method of claim 1, the method further comprising:
   determining, automatically by the computer system, a level of summarization, wherein the level of summarization determines an amount of information provided in the summary, wherein a high level of summarization results in the summary including less information than a low level of summarization, and
   wherein the summary is generated according to the level of summarization.

8. The method of claim 7, wherein the computer system dynamically adjusts the level of summarization according to user actions.

9. The method of claim 1, wherein the output device is selected from a group consisting of an e-reader, a laptop computer, a smartphone, and a tablet.

10. A system for providing summaries of non-target concepts in a work of authorship, the system comprising:
    a memory storing one or more natural language processing modules executable to generate a summary of a portion of text; and
    a processor circuit in communication with the memory, wherein the processor circuit is configured to perform a method comprising:

receiving a textual work;

dividing the textual work into a plurality of narrative blocks, each narrative block being a contiguous portion of text within the textual work, each narrative block being separated from other narrative blocks by linguistic delimiters;

receiving a selection of a target concept;

identifying a first set of narrative blocks and a second set of narrative blocks, the first set of narrative blocks including one or more narrative blocks of the plurality of narrative blocks that include the target concept, the second set of narrative blocks including one or more background narrative blocks, the one or more background narrative blocks being narrative blocks of the plurality of narrative blocks that do not include the target concept;

generating a concept path for the target concept, wherein the concept path includes the first set of narrative blocks ordered in a sequence, the sequence corresponding to a narrative progression of the target concept through the textual work;

generating, using a natural language processor, a knowledge graph based on the textual work, wherein the knowledge graph includes nodes that represent concepts and edges between nodes that represent links between concepts, wherein the natural language processor includes:

a tokenizer that is configured to convert a sequence of characters into a sequence of tokens by identifying word boundaries within the textual work, a part-of-speech tagger configured to determine a part of speech for each token using natural language processing and mark each token with its part of speech, a semantic relationship identifier configured to identify semantic relationships of recognized text elements in the textual work, and a syntactic relationship identifier configured to identify syntactic relationships amongst tokens, wherein generating the knowledge graph comprises:

identifying a plurality of concepts in the textual work;

determining which concepts in the textual work correspond to the same object using fuzzy logic and concept matching;

generating a single node for each group of concepts that correspond to the same object; and identifying edges between nodes by analyzing the textual work for subject-predicate-object triplets, wherein a node corresponding to a subject and a node corresponding to an object are linked by an edge corresponding to the predicate;

determining, using the knowledge graph, which non-target concepts are related to the target concept;

identifying a related background narrative block, the related background narrative block containing a particular non-target concept, the particular non-target concept being related to the target concept, wherein the related background narrative block is not in the concept path for the target concept;

generating a summary of the related background narrative block; and outputting the summary of the related background narrative block to an output device coupled with the computer system.

11. The system of claim 10, wherein the identifying the related background narrative block further comprises:

identifying, using the concept path for the target concept, a particular background narrative block in the second set of narrative blocks;

identifying the particular non-target concept;

determining that the particular non-target concept is related to the target concept using the knowledge graph; and determining that the particular background narrative block includes the particular non-target concept.

12. The system of claim 11, wherein the determining that the particular non-target concept is related to the target concept comprises:

determining a relatedness score for the particular non-target concept using the knowledge graph, the relatedness score being based on a relatedness of the particular non-target concept to the target concept; and determining that the particular non-target concept is related to the target concept by determining that the relatedness score for the particular non-target concept exceeds a threshold.

13. A computer program product comprising a computer readable storage medium having program instructions embodied therewith, the program instructions executable by a computer to cause the computer to perform a method comprising:

receiving one or more electronic documents;

performing optical character recognition to convert the one or more electronic documents into machine-encoded text;

dividing, after converting the one or more electronic documents into machine-encoded text, the one or more electronic documents into a plurality of narrative blocks, each narrative block being a contiguous portion of text within the one or more electronic documents, each narrative block being separated from other narrative blocks by linguistic delimiters;

receiving a selection of a target concept and a level of interest in the target concept;

identifying a first set of narrative blocks and a second set of narrative blocks, the first set of narrative blocks including one or more narrative blocks of the plurality of narrative blocks that include the target concept, the second set of narrative blocks including one or more background narrative blocks, the one or more background narrative blocks being narrative blocks of the plurality of narrative blocks that do not include the target concept;

generating a concept path for the target concept, wherein the concept path includes the first set of narrative blocks ordered in a sequence, the sequence corresponding to a narrative progression of the target concept through the one or more electronic documents;

generating, by a natural language processor, a knowledge graph based on the one or more electronic documents, wherein the knowledge graph includes nodes that represent concepts and edges between nodes that represent links between concepts, wherein the natural language processor includes:

a tokenizer that is configured to convert a sequence of characters into a sequence of tokens by identifying word boundaries within the textual work, a part-of-speech tagger configured to determine a part of speech for each token using natural language processing and mark each token with its part of speech, a semantic relationship identifier configured to identify semantic relationships of recognized text elements in the textual work, and a syntactic relationship identifier configured to identify syntactic relationships amongst tokens, wherein generating the knowledge graph comprises:
identifying a plurality of concepts in the textual work;
determining which concepts in the textual work correspond to the same object using fuzzy logic and concept matching;
generating a single node for each group of concepts that correspond to the same object; and
identifying edges between nodes by analyzing the textual work for subject-predicate-object triplets, wherein a node corresponding to a subject and a node corresponding to an object are linked by an edge corresponding to the predicate;

determining, using the knowledge graph, which non-target concepts are related to the target concept;

identifying a related background narrative block, the related background narrative block containing a particular non-target concept, the particular non-target concept being related to the target concept, wherein the related background narrative block is not in the concept path for the target concept;

generating, using the knowledge graph, a relatedness score for the particular non-target concept, the relatedness score being based on a relatedness of the particular non-target concept to the target concept, wherein the relatedness score for the particular non-target concept is based on a number of edges that connect the particular non-target concept to the target concept;

determining, automatically by the computer and based on the received level of interest and the relatedness score, a level of summarization for the related background narrative block, wherein the level of summarization determines an amount of information provided in the summary, wherein a high level of summarization results in the summary including less information than a low level of summarization;

generating a summary of the related background narrative block according to the level of summarization; and outputting the summary of the related background narrative block to an output device coupled with the computer system.

14. The computer program product of claim 13, wherein the identifying the related background narrative block further comprises:
identifying, using the concept path for the target concept, a particular background narrative block in the second set of narrative blocks;
identifying the particular non-target concept;
determining that the particular non-target concept is related to the target concept using the knowledge graph; and
determining that the particular background narrative block includes the particular non-target concept.

15. The computer program product of claim 14, wherein the determining that the particular non-target concept is related to the target concept comprises:

determining a relatedness score for the particular non-target concept using the knowledge graph, the relatedness score being based on a relatedness of the particular non-target concept to the target concept; and determining that the particular non-target concept is related to the target concept by determining that the relatedness score for the particular non-target concept exceeds a threshold.

16. The method of claim 4, the method further comprising:
determining, automatically by the computer system, a level of summarization for the related background narrative block, wherein the level of summarization determines an amount of information provided in the summary of the related background narrative block, wherein a high level of summarization results in the summary including less information than a low level of summarization,
wherein the level of summarization is based on the relatedness score for the particular non-target concept.

17. The method of claim 16, the method further comprising:
determining a type of summarization to apply to the related background narrative block based on the level of summarization, wherein an extractive summarization technique is used if the level of summarization is high and an abstractive summarization technique is used if the level of summarization is low.

18. The method of claim 1, wherein the outputting the summary of the related background narrative block to the output device comprises:
determining, based on a position of the related background narrative block within the textual work, a placement for the related background narrative block relative to the narrative blocks within the first set of narrative blocks;
generating a summarized version of the textual work, wherein the summarized version includes the first set of narrative blocks and the summary of the related background narrative block, wherein the first set of narrative blocks and the summary are arranged according to an order consistent with the order of the first set of narrative blocks and the related background narrative block in the textual work;
transmitting the summarized version of the textual work to the output device; and
displaying the summarized version of the textual work on the output device.

19. The method of claim 1, wherein the textual work is divided into the plurality of narrative blocks according to a granularity level, wherein each narrative block in the plurality of narrative blocks is one of a section in the textual work, a chapter in the textual work, and a paragraph in the textual work.

* * * * *